United States Patent [19]

Inoue et al.

[11] 4,163,671
[45] Aug. 7, 1979

[54] SILVER HALIDE PHOTOGRAPHIC MATERIAL CONTAINING ULTRAVIOLET LIGHT ABSORBING AGENT

[75] Inventors: Atsuo Inoue; Takeshi Mikami, both of Minami-ashigara, Japan

[73] Assignee: Fuji Photo Film Co., Ltd., Minami-ashigara, Japan

[21] Appl. No.: 896,871

[22] Filed: Apr. 17, 1978

[30] Foreign Application Priority Data

Apr. 25, 1977 [JP] Japan .................................. 52-47620

[51] Int. Cl.² .......................... G03C 1/84; G03C 1/72; G03C 1/76;
[52] U.S. Cl. ................................. 96/74; 96/84 UV; 96/95; 96/112; 96/119 R
[58] Field of Search ................. 96/84 UV, 74, 84 R, 96/95, 112, 119 R; 252/300

[56] References Cited

U.S. PATENT DOCUMENTS

| 2,322,005 | 6/1943 | Fierke et al. | 96/97 |
| 3,629,274 | 12/1971 | Oliver | 96/84 R |
| 3,652,284 | 3/1972 | Oliver | 96/84 R |
| 3,723,154 | 3/1973 | Oliver | 96/84 UV |
| 3,745,009 | 7/1973 | Jenkins et al. | 96/84 R |
| 4,045,229 | 8/1977 | Weber et al. | 96/84 UV |

Primary Examiner—Richard L. Schilling

Attorney, Agent, or Firm—Sughrue, Rothwell, Mion, Zinn and Macpeak

[57] ABSTRACT

A silver halide photographic material comprising a support having thereon at least one photosensitive silver halide emulsion layer with the silver halide photographic material containing at least one compound, as an ultraviolet absorbing agent, represented by the general formula (I)

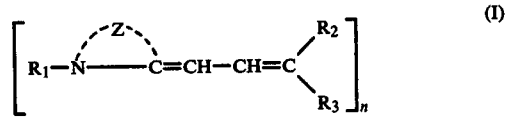

wherein Z represents the atoms necessary for forming a pyrrolidine nucleus or a thiazolidine nucleus; $R_1$ represents an alkyl group or an aryl group; $R_2$ and $R_3$, which may be the same or different, each represents a cyano group, a carboxy group, $-COR_4$ or $-COOR_4$; $R_4$ represents an alkyl group or an aryl group; and n represents 1 or 2, and when n is 2, one of $R_1$ and $R_4$ represents an alkylene group or an arylene group, in which the compound is a dimer; and a method of preventing the effects of ultraviolet light on a silver halide photographic material comprising incorporating into the silver halide photographic material, as an ultraviolet light absorbing agent, at least one compound represented by the general formula (I) above.

20 Claims, No Drawings

SILVER HALIDE PHOTOGRAPHIC MATERIAL CONTAINING ULTRAVIOLET LIGHT ABSORBING AGENT

BACKGROUND OF THE INVENTION

1. Field of the Invention

The present invention relates to silver halide black and white or color photographic materials and, more particularly, the present invention relates to silver halide color photographic materials wherein the undesirable influence of ultraviolet light are eliminated by the incorporation of specific ultraviolet absorbing agents into the silver halide photographic materials.

2. Description of the Prior Art

It is quite well known that ultraviolet light is harmful to photographic materials in many respects. Generally speaking, a photographic material, comprising a support of relatively high electric insulation such as films of cellulose triacetate, poly(ethylene terephthalate), polystyrene or polycarbonate, and paper laminates covered by such films and a light sensitive, photographic emulsion coating mainly comprising silver halide provided on the support, has surfaces of a fairly high electric insulative nature. Hence, during the manufacture and handling of the photographic material, the surfaces tend to be electrostatically charged through contact and friction with or separation from a foreign material of the same or different compositions. When the generated electrical charge accumulates to a certain critical level, the electrical charge discharges into the air forming discharging sparks. A photographic material, which has been subjected to such discharging sparks, has various irregular discharge patterns, such as arborescent, feather-like, spotty or radial patterns, thereon after development. These undesirable patterns occurring due to the above-described reason are referred to, in general, as static marks in the photographic art.

It is also well known in the photographic art that the spark light responsible for static marks is spectrally distributed between wavelengths of about 200 and about 550 nm, and that light between wavelengths of about 300 and about 400 nm is most abundant energetically. Therefore, as described in, for example, Japanese Patent Publication No. 10726/1975, Japanese Patent Application (OPI) No. 26,021 (the term "OPI" as used herein refers to a "published unexamined Japanese patent application"), French Pat. No. 2,036,679, etc., various attempts have been made to reduce the generating frequency of static marks by using a UV absorbing agent which effectively absorbs light between about 300 and about 400 nm to prevent the UV light from reaching the photo-sensitive layer.

Separately, except for lith-films and X-ray films which are used with specific light sources, general purpose photographic materials are also adversely affected by UV light present in the light used for image exposure. For example, monochromatic photographic materials tend to produce disadvantageously low contrast images when exposed to objects reflecting a large amount of UV light such as snow-covered landscapes, seashores or the sky. Color photographic materials, which are expected to record visible light only, suffer from the effects of UV light. As an example, objects such as distant landscapes, snow scenes, asphalt-paved roads, etc. which are abundant with UV region light tend to assume a cyan appearance. In addition, the color reproduction characteristics of photographic pictures obtained by the use of various light sources (sunlight, incandescent lamps and fluorescent lamps) depend to a great extent on the kind of light source used. One reason of this dependence is the difference in the spectral energy in the UV region present in the light. An exposure with an incandescent lamp causes the color image to be more reddish than that with sunlight, while an exposure with a fluorescent lamp will cause the color image to have a more bluish tint than that with sunlight. Accordingly, in order to achieve a correct color reproduction, prevention of UV light from reaching the silver halide photo-sensitive layers in the photographic film is quite effective. Various descriptions of this approach appear in, for example, Japanese Patent Publication No. 49029/1977 and U.S. Pat. No. 4,045,229, etc.

Moreover, color pictures, particularly those comprising dyes resulting from color development, are susceptible to UV light, which causes the dye image to fade and a discoloration thereof. On the other hand, the dye precursers remaining in the emulsion coating after color development produce a color stain when subjected to the action of UV light. Such a color stain is self-evidently undesirable for the finished product print. Of the variety of color photographic products available, reflection-type, positive prints are most likely to be subjected to UV radiation, since they are frequently observed under an intense illumination of sunlight which contains a large amount of UV light. The fading and discoloration of dye images are particularly promoted by light with wavelengths between about 300 and about 400 nm. In order to reduce the effect of the UV light in this wavelength region, various UV absorbing agents have been developed including those described in, for example, U.S. Pat. Nos. 3,215,530, 3,707,375, 3,705,805, 3,352,681, 3,278,448, 3,253,921, 3,738,837 and 4,045,229, Japanese Pat. Publication Nos. 26138/1974 and 25337/1975, and British Pat. No. 1,338,265. U.S. patent application Ser. No. 896,870 filed Apr. 17, 1978 discloses photographic materials containing novel UV absorbing agents.

UV absorbing agents for photographic products used to eliminate the various harmful effects of UV light described above should preferably have the following characteristics:

(1) complete or substantial transparency to visible light
(2) Good compatibility with the binder material
(3) Inertness to the photographic additives present in the silver halide light-sensitive member as well as in the photographic processing solutions.
(4) High efficiency of UV light absorption, particularly in the wavelength region between about 300 and about 400 nm.
(5) High stability to the action of UV light, heat and humidity Most conventional UV absorbing agents employed in silver halide photographic material not only do not meet these requirements, but also were not suited for the present purposes. For example, benzotriazole derivatives set forth in U.S. Pat. No. 3,253,921 and cinnamic acid derivatives set forth in U.S. Pat. Nos. 3,707,375 and 3,705,805, both of which have been extensively employed in photographic materials, have poor absorption characteristics in the spectral region between about 300 and about 400 nm, particularly between 365 and 400 nm with a broad tail near 400 nm.

Accordingly, such a UV absorber needs to be incorporated in a relatively high concentration in order to ensure the necessary absorbance, in which case, however, a considerable fraction of blue light with wavelengths longer than 415 nm is also absorbed, resulting in a decrease in the photographic speed and an undesirable coloration (stain). Therefore, the amount in the photographic material must be suppressed, and thus effective absorption of the UV light of wavelengths between about 365 and about 400 nm is not achieved, and satisfactory improvements in static mark prevention, color reproduction chcaracteristics and light fastness of the dye images are not obtained. Incorporation of a UV absorber in an amount sufficiently high to effectively achieve such improvements often results in additional technical problems including, for example, a poor adhesion between different coatings superimposed to form a multi-layer photographic material, and a deterioration in the physical properties of the film as represented by an increased tendency toward surface blocking, etc.

SUMMARY OF THE INVENTION

An object of this invention is to provide silver halide photographic materials containing ultraviolet absorbing agents for preventing the occurence of static marks, improving the color reproduction, and preventing the occurence of light fading and light discoloring of dye images.

Another object of this invention is to provide silver halide photographic materials containing ultraviolet absorbing agents to eliminate the undesirable phenomena described above without adversely influencing the photographic properties such as sensitivity, fog, etc., as well as on the physical properties such as adhesion, etc.

Still another object of this invention is to provide a method of protecting the silver halide in silver halide photographic materials and color images formed in silver halide photographic materials from the action of ultraviolet light, in particular ultraviolet light in the wavelength range of about 360 to about 395 nm.

The above-described objects of this invention are accomplished in one embodiment of this invention by a silver halide photographic material comprising a support having thereon a photosensitive silver halide emulsion layer with the silver halide photographic material containing at least one compound represented by the general formula (I)

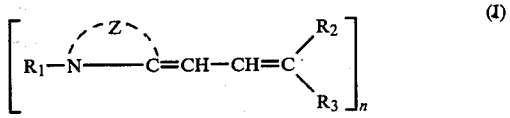

wherein Z represents the atoms necessary for forming a pyrrolidine nucleus or a thiazolidine nucleus; $R_1$ represents an alkyl group or an aryl group; $R_2$ and $R_3$, which may be the same or different, each represents a cyano group, a carboxy group, $-COR_4$, or $-COOR_4$; $R_4$ represents an alkyl group or an aryl group; and n represents 1 or 2; and when n is 2, one of $R_1$ and $R_4$ represents an alkylene group or an arylene group, with the compound being a dimer.

The above-described and other objects have also been achieved in another embodiment of this invention by a method of preventing the effects of ultraviolet light on a silver halide photographic material comprising a support having thereon at least one silver halide photosensitive emulsion layer by incorporating into said silver halide photographic material at least one compound represented by the general formula (I) described above.

DETAILED DESCRIPTION OF THE INVENTION

As the result of various investigations, it has now been discovered that by incorporating the ultraviolet absorbing agent represented by the general formula (I) described above in a photosensitive silver halide emulsion layer and/or a non-photosensitive hydrophilic colloid layer of a silver halide photographic material or, in particular, by incorporating the ultraviolet absorbing agent in the photographic layer or layers as described above as an emulsified dispersion thereof, ultraviolet light can be very effectively eliminated and further the various objects of this invention indicated above can be effectively accomplished.

As described above, the ultraviolet absorbing agents used in this invention are represented by the general formula (I)

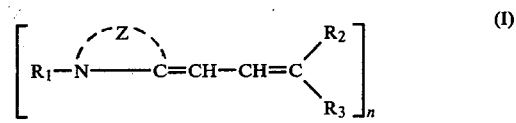

Z in the general formula (I) represents the atoms necessary for forming a pyrrolidine nucleus or a thiazolidine nucleus and these nuclei be substituted with one or more substituents. Examples of suitable substituents for Z are an alkyl group having 1 to 10 carbon atoms (which may be straight chain, branched chain or cyclic and which may be substituted with one or more of a hydroxy group, an alkoxy group, an aryl group, a carboxy group, a halogen atom, an alkoxycarbonyl group, a dialkylamino group, a cyano group, an aryloxy group, etc.), an aryl group having 6 to about 20 carbon atoms (which may be monocyclic or bicyclic and which may be substituted with one or more of the substituents described above for the above alkyl groups), and an alkoxy group having 1 to about 10 carbon atoms (in which the alkyl moiety may be straight chain, branched chain or cyclic). Specific examples of nuclei formed by Z are pyrrolidine, 4-methylpyrrolidine, 3,5-dimethylpyrrolidine, 4,4-dimethylpyrrolidine, 5,5-dimethylpyrrolidine, 3,5,5-trimethylpyrrolidine, 4-phenylpyrrolidine, 5-phenylpyrrolidine, thiazolidine, 5-methylthiazolidine, 4-methylthiazolidine, 4,5-dimethylthiazolidine, 4-phenylthiazolidine, 5-tolylthiazolidine, 5-phenethylthiazolidine, and the like.

n is 1 or 2.

$R_2$ and $R_3$, which may be the same or different, each represents a cyano group, a carboxy group, $-COR_4$, or $-COOR_4$.

$R_1$ and $R_4$, which may be the same or different, each represents an alkyl group or an aryl group.

The alkyl group represented by $R_1$ or $R_4$ may be straight chain, branched chain or cyclic and may be substituted. $R_1$ and $R_4$ are preferably an alkyl group having 1 to 20 carbon atoms which may be substituted with one or more of a hydroxy group, a halogen atom (e.g., a chlorine atom, a bromine atom, a fluorine atom, etc.), an aryl group (e.g., a phenyl group, a naphthyl group, a tolyl group, etc.), an alkoxycarbonyl group (e.g., a methoxycarbonyl group, an ethoxycarbonyl group, etc.), an alkoxy group (e.g., a methoxy group, an ethoxy group, a propoxy group, a methoxyethoxy group, etc.), an alkylcarbonyl group (e.g., an acetyl group, a valeryl group, etc.), an arylcarbonyl group (e.g., a benzoyl group, a toluoyl group, a naphthoyl group, etc.), an alkylcarbonyloxy group (e.g., an acetoxy group, a valeryloxy group, a stearoyloxy, etc.), an arylcarbonyloxy group (e.g., a benzoyloxy group, a toluoyloxy group, etc.), a cyano group, an alkylsulfonyl group (e.g., a mesyl group, an ethanesulfonyl group, etc.), an arylsulfonyl group (e.g., a tosyl group, a benzenesulfonyl group, etc.), a carbamoyl group, an N,N-dialkylcarbamoyl group (e.g., an N,N-diethylcarbamoyl group, an N,N-dibutylcarbamoyl group, etc.), an N-alkyl-N-arylcarbamoyl group (e.g., an N-ethyl-N-phenylcarbamoyl group, an N-methyl-N-tolylcarbamoyl group, etc.), an N-alkylcarbamoyl group (e.g., an N-n-butylcarbamoyl group, an N-ethylcarbamoyl group, etc.), a morpholinocarbamoyl group, a sulfo group, a carboxy group, an N,N-dialkylamino group (e.g., an N,N-dimethylamino group, an N,N-diethylamino group, etc.), an aryloxy group (e.g., a phenoxy group, a tolyloxy group, etc.), an alkenyl group (e.g., a vinyl group, an allyl group, etc.), etc. Specific examples of alkyl groups represented by $R_1$ and $R_4$ include, for example, a methyl group, an ethyl group, a butyl group, a hexyl group, an octyl group, a decyl group, a dodecyl group, an octadecyl group, a cyclohexyl group, a $\beta$-cyclohexylethyl group, a 2-ethylhexyl group, a hydroxyethyl group, a trifluoroethyl group, a perfluorohexyl group, a benzyl group, a phenethyl group, a p-methylphenethyl group, a methoxycarbonylethyl group, an ethoxycarbonylethyl group, an ethoxyethyl group, a 2-[2-(2-ethoxy)ethoxy]ethyl group, an acetylethyl group, a methylsulfonylethyl group, a cyanoethyl group, a carbamoylethyl group, an N,N-diethylcarbamoyl group, a morpholinocarbonylethyl group, an N-methylanilinocarbonylpropyl group, an N,N-diethylaminopropyl group, a phenoxyethyl group, a 2-(2,4-di-tert-amylphenoxy)ethyl group, a 2,4-di-tert-amylphenoxypropyl group, a 2-p-tertbutylphenoxyl group, an aryl group, etc.

The aryl group represented by $R_1$ and $R_4$ can be a monocyclic aryl group or a bicyclic aryl group, can have 6 to 20 total carbon atoms and can be substituted with one or more substituents. Examples of suitable substituents for the aryl group of $R_1$ and $R_4$ are an alkyl group, an alkoxy group, a halogen atom, a cyano group, an amino group, a carboxy group, etc. Specific examples of aryl groups represented by $R_1$ and $R_4$ are, for example, a phenyl group, a tolyl group, a xylyl group, an anisyl group, a p-butoxyphenyl group, a p-chlorophenyl group, a p-cyanophenyl group, a p-N,N-dimethylaminophenyl group, a naphthyl group, etc.

When n is 2, one of $R_1$ and $R_4$ represents a divalent group comprising an alkylene group or an arylene group (e.g., having substantially the same number of carbon atoms as in the alkyl group and the aryl group described above), the divalent group may be a moiety consisting of an alkylene group and an arylene group, and in this case the compound of the general formula (I) is a dimer.

Particularly preferred compounds represented by the general formula (I) are the compounds represented by the general formula (II) shown below:

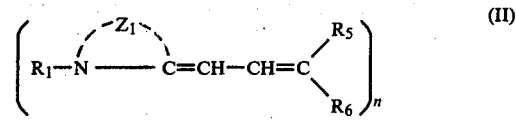

wherein $Z_1$ represents the atoms necessary for forming the pyrrolidine ring as described above; $R_5$ and $R_6$, which may be the same or different, each represents a cyano group, a carboxy group, or —$COOR_7$; and $R_1$, $R_7$ and n have the same meaning as $R_1$, $R_4$ and n, respectively, in the general formula (I).

When the ultraviolet absorbing agent of this invention is incorporated into photographic materials as an emulsified dispersion thereof, it is preferred for the group represented by $R_1$, $R_5$ and $R_6$ to not be a group rendering the ultraviolet absorbing agent water-soluble or hydrophilic, such as a sulfo group or a carboxy group, or for the group represented by $R_1$, $R_5$ and $R_6$ to not contain such a group rendering the ultraviolet absorbing agent water-soluble as a substituent.

More preferably, when the compound of the general formula (I) is a monomer, the total of the number of carbon atoms of $R_1$, $R_5$ and $R_6$ is 10 to 40 and, when the compound of the general formula (I) is a dimer, the total (when $R_6$ or $R_5$ is a divalent group) number of carbon atoms of $R_6$ (or $R_5$) and twice the number of carbon atoms of $R_1$ or the total (when $R_1$ is a divalent group) of the number of carbon atoms of $R_1$ and twice the number of carbon atoms of $R_6$ (or $R_5$) is 14 to 45.

In other words, preferred compounds of the general formula (I) are solid compounds having a melting point below about 150° C. or are liquid compounds at room temperature.

Particularly preferred compounds of the general formula (I) are solid compounds having a melting point below about 100° C. or are liquid compounds.

These compounds of the general formula (I) are preferred since the objects of this invention can be effectively accomplished since these compounds are very stable (or precipitate only with difficulty) in an aqueous hydrophilic colloid solution and the spectral absorption curve of an aqueous hydrophilic colloid solution containing these compounds shows an excellent sharp cut property at about 405 nm.

The absorption maximum of the ultraviolet absorbing agents used in this invention generally differs between a methanol solution thereof and an aqueous hydrophilic colloid solution thereof. That is, when the ultraviolet absorbing agent of this invention is added to an aqueous hydrophilic colloid solution by "latex dispersion," the absorption maximum can be shifted to a longer wavelength side to at most about 5 nm over that of a methanol solution thereof and also when the ultraviolet absorbing agent is dissolved in a substantially water-insoluble high-boiling organic solvent and then the solution thereof is dispersed by emulsification into an aqueous hydrophilic colloid solution, the absorption maximum can be shifted to a longer wavelength side to about at most 30 nm over a methanol solution thereof. Therefore, the ultraviolet absorbing agent can be incorporated into silver halide photographic materials by appropriately selecting the dispersing method depending on the absorption characteristics of the ultraviolet absorbing agent to be used.

Typical examples of the compounds of this invention represented by the general formula (I) are illustrated below by structural formulae together with their absorption maxima measured at $1 \times 10^{-5}$ mol/(liter methanol) concentration at room temperature (about 25° C.):

| | $\lambda_{max}^{MeOH}$ |
|---|---|
| Compound 1<br>[piperidine]N(C$_{12}$H$_{25}$(n))−C=CH−CH=C(CN)(CN) | 388 nm |
| Compound 2<br>[piperidine]N(C$_2$H$_5$)−C=CH−CH=C(CN)(CN) | 386 nm |
| Compound 3<br>CH$_3$-[piperidine]N(C$_{10}$H$_{21}$(n))−C=CH−CH=C(CN)(CN) | 388 nm |
| Compound 4<br>[piperidine]N(CH$_2$CH=CH$_2$)−C=CH−CH=C(CO$_2$C$_6$H$_{12}$-(n))(CO$_2$C$_6$H$_{12}$-(n)) | 388 nm |
| Compound 5<br>[piperidine]N(C$_6$H$_{13}$(n))−C=CH−CH=C(CN)(CO$_2$(CH$_2$)$_2$O−C$_6$H$_3$(C$_5$H$_{11}$-(t))(C$_5$H$_{11}$-(t))) | 391 nm |
| Compound 6<br>[S,N-ring]N((CH$_2$)$_2$O−C$_6$H$_3$(C$_5$H$_{11}$-(t))(C$_5$H$_{11}$-(t)))−C=CH−CH=C(CN)(CN) | 396 nm |
| Compound 7<br>[S,N-ring]N(C$_4$H$_9$-(n))−C=CH−CH=C(CO$_2$C$_6$H$_{13}$-(n))(CO$_2$C$_6$H$_{13}$-(n)) | 397 nm |
| Compound 8<br>[piperidine]N(C$_{10}$H$_{21}$-(n))−C=CH−CH=C(CN)(CO$_2$CH$_2$CH$_2$O$_2$C)−C(CN)=CH−CH=C−N(C$_{10}$H$_{21}$-(n))[piperidine] | 390 nm |

Typical synthesis examples of producing the compounds of this invention represented by the general formula (I) are shown below. Unless otherwise indicated herein, all parts, percents, ratios and the like are by weight.

Synthesis Example 1

Synthesis of Compound 2:

To 100 ml of ethanol were added 34 g of 2-(2-anilinovinyl)-1-ethylpyrrolinium iodide, 7 g of malononitrile, and 15 g of acetic anhydride and then the mixture was refluxed for one hour under heating. After cooling, 200 ml of water was added to the reaction mixture obtained and the crystals precipitated were recovered by filtration. By recrystallizing the crystals from methanol, 14.8 g of Compound 2 having a melting point of 157° C. was obtained.

Synthesis Example 2

Synthesis of Compound 7:

To 200 ml of ethanol were added 40 g of 2-(2-N-acetylanilinovinyl)-3-butylazoliniumiodide, 30 g of dihexyl malonate, and 20 g of triethylamine and after refluxing the mixture for one hour under heating, ethanol was distilled off under reduced pressure. After adding 100 ml of diethyl ether to the residue followed by stirring and filtering away insoluble materials, the diethyl ether was distilled off from the mother liquor. Then, by subjecting the remaining oily material to a chromatographic separation (diethyl ether solvent) using 1 kg of silica gel, "Kieselgel 60", made by Merck & Co., Ltd.), 13 g of Compound 7 as an oil was obtained.

Other ultraviolet absorbing agents of this invention can be also produced according to the procedures described in Synthesis Examples 1 and 2 above with some modifications. Also, synthetic procedures described in U.S. Pat. Nos. 3,486,897 and 3,652,284 and F. M. Hamer; *The Cyanine Dyes and Related Compounds*, Interscience Publishers, (1964) can be used.

The ultraviolet absorbing agents used in this invention have a very high spectral absorption density in the wavelength region of about 360 to about 395 nm as compared with conventional ultraviolet absorbing agents for photography and hence when the ultraviolet absorbing agents of this invention are used, a desired absorption density can be obtained only by using a small amount thereof. Furthermore, since the ultraviolet absorbing agents of this invention do not absorb substantially any light in the wavelength region longer than about 410 nm (in particular, do not visible light of a wavelength longer than about 420 nm), they do not cause adverse influences, such as coloring and desensitization, on the photographic materials to occur.

The ultraviolet absorbing agents (some of which are substantially insoluble in water or some of which are liquid at room temperature (about 25° C.) of this invention) may be incorporated in silver halide photographic materials by dissolving them in a water-soluble solvent (e.g., acetone, methyl Cellosolve, methanol, ethanol, etc.) and dispersing the solution directly in the coating composition for a non-photosensitive hydrophilic colloid layer or a photosensitive silver halide emulsion layer of the photographic material. However, the ultraviolet absorbing agents of this invention are preferably used employing the following dispersion techniques.

(A) The ultraviolet absorbing agent can be dissolved in a substantially water-insoluble high-boiling organic solvent (hereinafter, is referred to as an "oil") and dispersing by emulsification the solution in an aqueous hydrophilic colloid solution (when the ultraviolet absorbing agent is in an oily state at room temperature, the ultraviolet absorbing agent may be dispersed by emulsification in an aqueous hydrophilic colloid solution without using a solvent as described above).

(B) The ultraviolet absorbing agent can be dispersed by emulsification in an aqueous latex in the presence of a substantially water-insoluble auxiliary solvent as shown below and adding the emulsified dispersion to the coating composition for a photosensitive silver halide emulsion layer or a non-photosensitive hydrophilic colloid layer (e.g., a surface protective layer, an antihalation layer, a subbing layer, a yellow filter layer, an interlayer, a backing layer, etc.).

Suitable examples of auxiliary solvents which can be used in the formation of the emulsified dispersion described above include water-soluble solvents such as methanol, acetone, methyl Cellosolve, etc., and substantially water-insoluble solvents such as ethyl acetate, butyl acetate, etc., for example, as described in U.S. Pat. Nos. 2,739,888 and 3,351,681 and Japanese Patent Application (OPI) No. 59943/1976.

The oil used in method (A) is an oil having a boiling point higher than about 140° C., preferably higher than 170° C., and specific examples of such oils are alkyl esters of phthalic acid (e.g., dibutyl phthalate, dioctyl phthalate, etc.), trimellitic acid esters (e.g., tri-t-octyl trimellitate, etc.), aromatic ethers (e.g., anisole, phenetole, phenyl ether, etc.), phosphoric acid esters (e.g., diphenyl phosphate, triphenyl phosphate, tricresyl phosphate, dioctylbutyl phosphate, etc.), citric acid esters (e.g., tributyl acetylcitrate, etc.), and alkylamides (e.g., N,N-diethyllaurylamide, etc.).

Also, the above described aqueous hydrophilic colloid solution includes the ordinary aqueous hydrophilic colloid solutions for photographic as described in U.S. Pat. No. 2,322,027 and the so-called aqueous latex (oil-in-water type dispersion) formed by dispersing a polymer in the above described aqueous solution.

Gelatin is advantageously used as the hydrophilic colloid in these layers but other hydrophilic colloids may be used. For example, gelatin derivatives; graft polymers of gelatin and other polymers; proteins such as albumin, casein, etc.; cellulose derivatives such as hydroxyethyl cellulose, carboxymethyl cellulose, cellulose sulfuric acid esters, etc.; saccharide derivatives such as sodium alginate, starch derivatives, etc.; and various synthetic hydrophilic polymers such as polyvinyl alcohol, polyvinyl alcohol partial acetal, poly-N-vinylpyrrolidone, polyacrylic acid, polymethacrylic acid, polyacrylamide, polyvinylimidazole, polyvinylpyrazole, etc.; can be used in this invention.

Specific examples of gelatin derivatives which can be used as the hydrophilic colloid in this invention are those obtained by reacting gelatin and various compounds such as acid halides, acid anhydrides, isocyanates, bromoacetic acid, alkanesultones, vinylsulfonamides, maleinimide compounds, polyalkylene oxides, epoxy compounds, etc. These materials are described in, for example, U.S. Pat. Nos. 2,614,928, 3,132,945, 3,186,846, 3,312,552, British Pat. Nos. 861,414, 1,033,189 and 1,005,784 and Japanese Patent Publication No. 26845/1967.

Examples of the above-described graft polymers of gelatin include graft polymers formed by grafting gelatin to homopolymers or copolymers of vinylic monomers such as acrylic acid, methacrylic acid, the esters and amides of acrylic acid or methacrylic acid, acrylonitrile, styrene, etc. In particular, graft polymers of gelatin with polymers having some degree of compatibility with gelatin, such as polymers of acrylic acid, methacrylic acid, methacrylamide, acrylamide, hydroxyalkyl methacrylate, etc., are preferred. Examples of these graft polymers are described in U.S. Pat. Nos. 2,763,625, 2,831,767 and 2,956,884.

Further, typical examples of synthetic hydrophilic polymers which can be used in this invention as the hydrophilic colloid are described in, for example, German Patent Application (OLS) 2,312,708, U.S. Pat. Nos.

3,620,751 and 3,879,205 and Japanese Patent Publication No. 7561/1968.

The latex polymer used for the purpose described above may be selected from water-insoluble or water sparingly soluble synthetic polymers which are known as being suitable for improving the properties of films. For example, polymers composed of a monomer or monomers such as alkyl acrylates, alkyl methacrylates, alkoxyalkyl acrylates, alkoxyalkyl methacrylates, glycidyl acrylates, glycidyl methacrylates, acrylamide, methacrylamide, vinyl esters (e.g., vinyl acetate), acyronitrile, olefins, styrene, etc., and polymers composed of combinations of the above-illustrated monomers and acrylic acid, methacrylic acid, $\alpha,\beta$-unsaturated dicarboxylic acids, hydroxyalkyl acrylates, hydroxyalkyl methacrylates, sulfoalkyl acrylates, sulfoalkyl methacrylates, styrenesulfonic acid, etc., can be used. Examples of these synthetic polymers are described in Japanese Patent Application (OPI) No. 74538/1974, U.S. Pat. Nos. 2,376,005, 2,739,137, 2,853,457, 3,062,674, 3,411,911, 3,488,708, 3,525,620, 3,607,290, 3,635,715, 3,645,740 and British Pat. Nos. 1,186,699 and 1,307,373. Preferred examples of these polymers are, for example, alkyl acrylate copolymers (e.g., a copolymer of ethyl acrylate and acrylic acid) and the vinyl polymers described in Japanese Patent Application (OPI) No. 74538/1974.

The ultraviolet absorbing agents of the present invention are employed in an amount of about 5 to 3,000 mg/m$^2$ in the photographic light-sensitive material of the present invention. A suitable coating amount is about 5 to about 1,500 mg/m$^2$. A suitable coating amount of the ultraviolet absorbing agent of the present invention is from about 50 to about 1,500 mg/m$^2$, and particularly about 100 to about 1,500 mg/m$^2$, in a color paper. A suitable coating amount of the ultraviolet absorbing agent of the present invention is from about 5 to about 650 mg/m$^2$, and particularly about 30 mg to about 500 mg/m$^2$ in a color negative film, color reversal film, etc.

Also, a suitable ratio of the ultraviolet absorbing agent of this invention to the oil is 1 g to from 0 to about 10 ml, preferably 1 g to from 0 to 4 ml. A suitable ratio of the auxiliary solvent to the ultraviolet absorbing agent is the same as or slightly larger than that of the oil.

It is possible for the ultraviolet absorbing agent of this invention to be dissolved in an oil and the solution to be directly dispersed by emulsification in a coating composition. However, in incorporating the ultraviolet absorbing agent in the coating compositions for color photographic materials, it is preferred for an emulsified dispersion in which the ultraviolet absorbing agent is dissolved in the polymer in an aqueous latex to be added to the coating composition or for an emulsified dispersion prepared by dispersing by emulsification an oil having dissolved therein the ultraviolet absorbing agent in an aqueous hydrophilic colloid solution to added to the coating composition.

Since the ultraviolet absorbing agent of this invention thus incorporated in photographic materials provides good effects in a smaller amount than achieved in using conventional ultraviolet absorbing agents, a softening of the photographic layers and a reduction in adhesion between photographic layers of multilayer color photographic materials does not occur when the ultraviolet absorbing agent is used and also adhesion of the photographic materials with each other does not occur. Furthermore, the ultraviolet absorbing agents of this invention are stable or do not undergo a coalescence or aggregation of the particles thereof and deposition of crystals in the emulsified dispersion thereof and in a solution thereof in a water-soluble organic solvent does not occur. Thus, when the dispersion or the organic solvent solution is added to a photosensitive silver halide emulsion or a non-photosensitive hydrophilic colloid solution (e.g., a gelatin sol), the emulsion or the solution does not become opaque and remains stable. The ultraviolet absorbing agents of this invention are also stable unexpectedly to heat.

Furthermore, by using the ultraviolet absorbers of this invention together with the photographic ultraviolet absorbers as described in U.S. Pat. Nos. 3,253,921, 3,707,375, 3,075,805, 3,271,156, 3,754,919 and 3,794,493, British Patent No. 1,338,265, Japanese Pat. Publication No. 25337/1975, U.S. Pat. Nos. 3,692,525, 3,738,837 and 3,698,907, Japanese Pat. Publication Nos. 26138/1974 and 26139/1974 and U.S. Pat. Nos. 3,936,305, 3,687,671 and 3,694,211, photographic antioxidants (e.g., hydroquinone derivatives, catechol derivatives, aminophenol derivatives, gallic acid derivatives, etc.), and color image-forming agents (e.g., photographic yellow couplers, etc.), ultraviolet light of comparatively short wavelengths, i.e., shorter than about 360 nm, can be effectively absorbed.

The ultraviolet absorbing agent of this invention is preferably incorporated in a surface protective layer, a backing layer, an antihalation layer and also, in color photographic materials, in the uppermost photosensitive silver halide emulsion layer and an interlayer in addition to the above-described non-photosensitive hydrophilic colloid layers.

Various silver halides can be used in the present invention, including silver bromide, silver chloride, silver iodobromide, silver chlorobromide, silver chloroiodobromide, etc., which can be prepared in the form of a photographic emulsion using various well-known methods. The silver halide photographic emulsion can be sensitized using a chemical sensitizer (e.g., sulfur containing sensitizers such as thiourea, allyl thiocarbamide, allyl isothiocyanate, cystine, etc., gold compounds such as potassium chloroaurate, auric trichloride, potassium auric thiocyanate, etc., and other noble metal compounds), and a reducing sensitizer well-known in the photographic art. Further, the silver halide emulsion can contain a stabilizer or an anti-foggant such as a triazole, an imidazole, an azoindene, etc.

The color photographic materials of the present invention can contain a number of color image forming agents including, for example, two or four equivalent type yellow couplers such as benzoylacetoanilide or pivaloylacetoanilide derivatives, two or four equivalent type magenta couplers such as pyrazolone or imidazolone derivatives, two or four equivalent type cyan couplers such as phenol and naphthol derivatives and colored couplers which give rise to cyan or magenta dyes. (These two equivalent type couplers described above may be of the DIR type). These couplers are desirably non-diffusing couplers. The photographic materials of this invention can also contain diffusible dye releasing redox compounds, color developing agents for couplers of the diffusible dye releasing type, etc.

Still other additives including, for example, spectral sensitizers, color stain preventing agents, anti-fading agents, hardening agents, surfactants, anti-static agents, etc., can also be incorporated into the photographic material. Examples of these compounds are described in, for example, U.S. Pat. No. 3,996,055 (column 23, line 23 to column 37, line 25); U.S. Pat. No. 3,994,729 (column 2, line 15 to column 5, line 61) and U.S. Pat. No. 3,997,348 (column 6, line 51 to column 31, line 9).

Suitable photographic products according to the present invention include black and white, high-speed photographic films, microfilms, films for the graphic arts (lith films, etc.), color negative films, color reversal films, color direct positive films, color positive papers, diffusion transfer type color materials, etc.

The photographic materials produced in accordance with the present invention can be processed in an ordinary manner or using a DTR color processing liquid incorporated in the photographic material itself. For example, the methods described in *The Journal of the Society of Motion Picture and Television Engineers,* Vol. 61 (1953), pp 667-701, can be employed.

By using a silver halide photographic material based on the present invention, not only can fog generation by static phenomena be effectively prevented during the manufacture and storage of the photographic material, but images which are quite clear can be produced due to efficient cutoff of ultraviolet light reflected by the object. Particularly in the case of a color photographic material, fluctuations in color reproduction due to the difference in UV absoprtion by camera lenses can be suppressed, thus providing color images of high fidelity. Further, fading or discoloration of the resulting dye images is also prevented. It is important that these advantages can be achieved without any sacrifice of properties such as photographic speed, fog, adhesive properties, and other photographic as well as physical characteristics.

The invention is further explained in greater detail by reference to the specific examples of the invention given below.

EXAMPLE 1

A mixed solution (1) of 100 g of a 10% aqueous gelatin solution and 75 ml of a 5% aqueous solution of sodium dodecylbenzenesulfonate was heated to 50° C. and after adding thereto a mixed solution (2) of 40 ml of dibutyl phthalate, 100 ml of ethyl acetate, and 20 ml of a 20% methanol solution of sorbitan monolaurate heated to 50° C., the mixture was stirred for 5 minutes using a high-speed stirring-type homogenizer to produce an Emulsified Dispersion A as a control dispersion. Separately, a mixed solution (3) prepared by adding 80 g of Compound 1 to mixed solution (2) described above was dispersed by emulsification in mixed solution (1) to produce an Emulsified Dispersion B.

Similarly, an Emulsified Dispersion C containing 80 g of Compound 5, an Emulsified Dispersion D containing 20 g of 2-(2-hydroxy-5-tert-butyl)phenylbenzotriazole and 80 g of Compound 1, an Emulsified Dispersion F containing 12 g of 2-(2-hydroxy-5-tert-butyl)phenylbenzotriazole, and an Emulsified Dispersion G containing 120 g of 4-methoxy-α-cyanocinnamic aic-n-decyl ester were prepared.

Then, 1,000 g of an aqueous latex (solid content: 10% by weight) of a copolymer of ethyl acrylate and acrylic acid (95:5 copolymerization mole ratio) was further mixed with mixed solution (1) and then a solution the same as mixed solution (3) but containing dibutyl phthalate was dispersed by emulsificatiion in the above mixture to provide an Emulsified Dispersion E.

Silver halide photographic materials were prepared by coating the following photographic layers on a cellulose triacetate film support:

First Layer:

An antihalation layer containing the following dyes mordanted by the mordant shown below:

Cyan Dye:

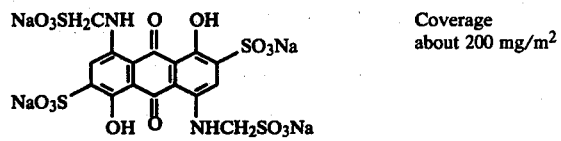

Coverage about 200 mg/m²

Magenta Dye:

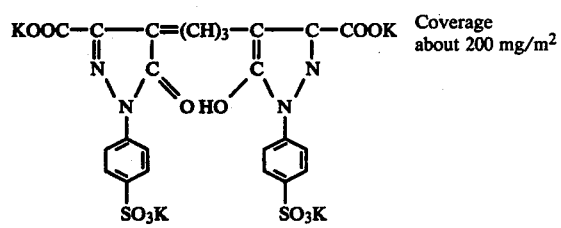

Coverage about 200 mg/m²

Yellow Dye:

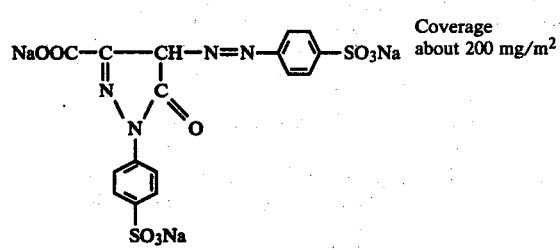

Coverage about 200 mg/m²

Mordant:

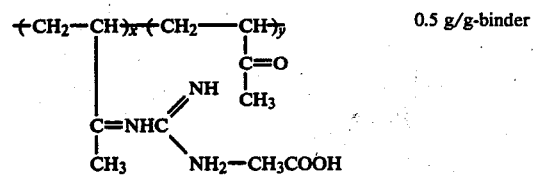

0.5 g/g-binder (x : y 77 : 33 molar ratio)

Second Layer:

A red-sensitive gelatino silver iodobromide emulsion layer (AgI: 4 mole%; silver/coupler ratio: 25:1; coverage of silver: 30 mg/100 cm²) containing the oil-soluble and non-diffusible cyan couplers shown below.

Cyan Couplers:

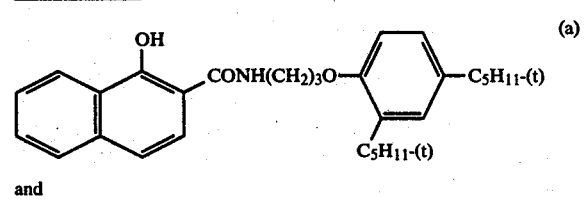

and

-continued

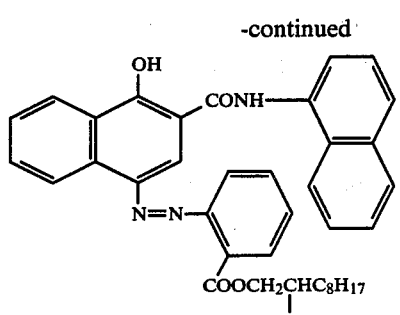

[(a) : (b) = 5 : 1 by weight]

Third Layer:
An interlayer composed of gelatin.

Fourth Layer:
A green-sensitive gelatino silver iodobromide emulsion layer (AgI: 3.5 mole%; silver/coupler mole ratio: 35:1; and coverage of silver: 20 mg/100 cm$^2$) containing the non-diffusible magenta couplers shown below.

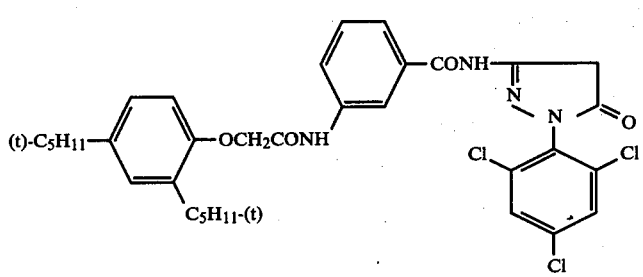

and

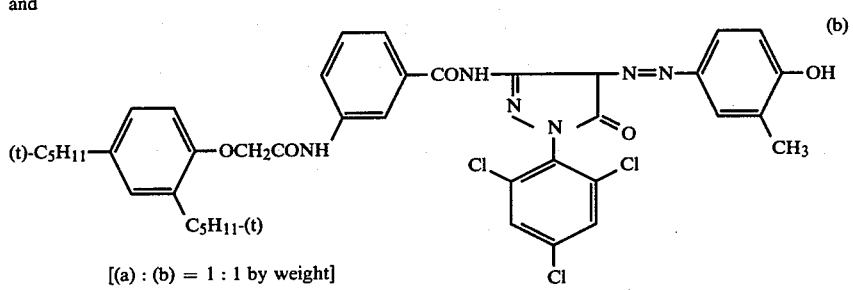

[(a) : (b) = 1 : 1 by weight]

Fifth Layer:
A gelatin layer having a yellow filter action (the same dyes as in the First Layer was used in a dye coverage of 300 mg/m$^2$).

Sixth Layer:
(b) A gelatino silver iodobromide emulsion layer (AgI: 3 mole%; silver/coupler mole ratio: 10:1, and coverage of silver: 15 mg/100 cm$^2$) containing the non-diffusible yellow coupler shown below.

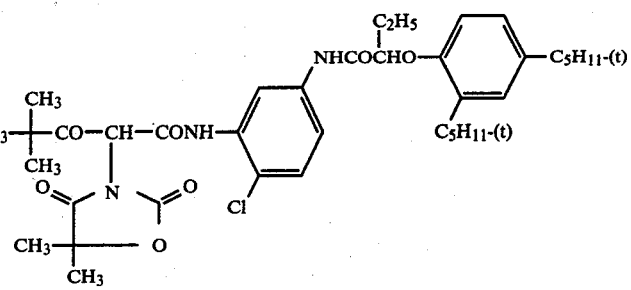

Seventh Layer:
Emulsified Dispersion A was coated on the Sixth Layer as the Seventh Layer at a coverage of 1.50 g/m$^2$ to produce Sample (1). The same procedures as described above were repeated to produce Samples (2) to (7) with Emulsified Dispersion B being coated on the Sixth Layer in place of Emulsified Dispersion A to produce Sample (2), Emulsified Dispersion C being coated on the Sixth Layer in place of Emulsified Dispersion A to produce Sample (3), Emulsified Dispersion D being coated on the Sixth Layer in place of Emulsified Dispersion A to produce Sample (4), Emulsified Dispersion E being coated on the Sixth Layer in place of Emulsified Dispersion A to produce Sample (5), Emulsified Dispersion F being coated on the Sixth Layer in place of Emulsified Dispersion A to produce Sample (6), and Emulsified Dispersion G was coated on the Sixth Layer in place of Emulsified Dispersion A to produce Sample (7).

The Seventh Layer of Samples (1) to (7) above is described in Table 1 below.

Table 1

| | Emulsified or Latex Dispersion | | | | | | |
|---|---|---|---|---|---|---|---|
| | A | B | C | D | E | F | G |
| Aqueous solution of 10% Gelatin (10% aq. soln.) | 1000 g | 1000 g | 1000 g | 1000 g | 1000 g | 1000 g | 1000 g |
| Sodium Dodecyl-benzenesulfonate (5% aq. soln.) | 75 ml | 75 ml | 75 ml | 75 ml | 75 ml | 75 ml | 75 ml |
| Ethyl Acrylate-Acrylic Acid Co-polymer (aqueous latex) (10% aq. soln.) | — | — | — | — | 1000 g | — | — |
| Dibutyl Phthalate | 40 ml | 40 ml | 40 ml | 40 ml | — | 40 ml | 40 ml |
| Ethyl Acetate | 100 ml | 100 ml | 100 ml | 100 ml | 100 ml | 100 ml | 100 ml |
| Sorbitan Monolaurate (20% methanol soln.) | 20 ml | 20 ml | 20 ml | 20 ml | 20 ml | 20 ml | 20 ml |
| Compound 1 | — | 80 g | — | 80 g | 80 g | — | — |
| Compound 5 | — | — | 80 g | — | — | — | — |
| 2-(2-Hydroxy-5-tert-butyl)-phenylbenzotriazole | — | — | — | 20 g | — | 120 g | — |
| 4-Methoxy-α-cyanocinnamic Acid n-Decyl Ester (for comparison) | — | — | — | — | — | — | 120 g |

To measure the change in color balance of the photographic materials due to the difference in cameras each using a lens having a specific spectral transmittance in the ultraviolet region, a grey chart was photographed on the photographic materials prepared above using a camera having a lens with good transmission in the ultraviolet region and the same camera using a filter capable of cutting light of wavelengths shorter than 390 nm.

Samples (1) to (7) produced and exposed as described above were processed as follows.

| Color Development | 38° C. | 3 min. | 15 sec. |
|---|---|---|---|
| Bleach | 38° C. | 6 min. | 30 sec. |
| Wash | 38° C. | 3 min. | 15 sec. |
| Fix | 38° C. | 6 min. | 30 sec. |
| Wash | 38° C. | 3 min. | 15 sec. |
| Stabilization | 38° C. | 1 min. | 30 sec. |

The processing compositions used in the above processing were as follows:

Color Developer
| | |
|---|---|
| Water | 800 ml |
| Potassium Carbonate (anhydrous) | 38 g |
| Sodium Sulfite (anhydrous) | 4 g |
| Sodium Bromide | 1.5 g |
| Hydroxylamine Sulfate | 2.5 g |
| EDTA | 2.5 g |
| 4-[N-Ethyl-N-(β-ethoxyethyl-amino]-2-methylaminiline sulfate | 4.7 g |
| Water to make | 1 liter |
| pH 10.0 | |

Bleach Solution
| | |
|---|---|
| Water | 600 ml |
| Ammonium Bromide | 150 g |
| EDTA-Fe(II) Sodium Salt | 100 g |
| Glacial Acetic Acid | 10 ml |
| EDTA | 10 g |
| Water to make | 1 liter |
| pH 6.0 | |

Fix Solution
| | |
|---|---|
| Water | 800 ml |
| Ammonium Thiosulfate (70% aq. soln.) | 140 ml |
| Sodium Hydrogensulfite (anhydrous) | 12 g |
| Water to make | 1 liter |

Stabilization Solution
| | |
|---|---|
| Water | 800 ml |
| Formaldehyde (37% aq. soln.) | 5.0 ml |
| Polyethylene Glycol | 0.2 g |
| Ethylene Glycol | 2 g |
| Water to make | 1 liter |

After processing the photographic materials as described above, the color densities of the negative images formed using both lenses were measured using red light, green light, and blue light, respectively. The density differences of both negative images for red, blue and green light are shown in Table 2 below.

Table 2

| Density Difference* | Sample | | | | | | |
|---|---|---|---|---|---|---|---|
| | (1)** | (2) | (3) | (4) | (5) | (6)** | (7)*** |
| Red | 0 | 0 | 0 | 0 | 0 | 0 | 0 |
| Green | 0 | 0 | 0 | 0 | 0 | 0 | 0 |
| Blue | 0.15 | 0.06 | 0.06 | 0.05 | 0.04 | 0.13 | 0.12 |

*The numeral values in Table 2 each is the difference between the density when photographed using a lens capable of transmitting completely ultraviolet light and the density photographed using the lens and a filter capable of cutting light having wave lengths shorter than 390 nm, the density being measured using red light, green light, or blue light.
**Control sample
***Comparison sample From the results shown in Table 2 above, it is clear that in the photographic materials of this invention (Samples (2) to (5) each containing Compound 1 or 5, the change in blue density was less, the influence of the change in transmittance in the ultraviolet region was low, and the grey balance was better with the use of a small amount of the compound of this invention as compared with the control sample (Sample (1)) and the comparison samples (Samples (6) and (7)).

When colloidal silver compositions (4 mg/100 cm$^2$ and 1 mg/100 cm$^2$) were used in place of the dyes in the above-described First Layer and Third Layer, the same results as above was obtained. Also, when Compound 2 or 7 was used, the same excellent result as in the case of using Compound 1 or 5 was also obtained.

EXAMPLE 2

A photographic material, Sample (I) was prepared by following the same procedures as described in Example 1 (First Layer to Fifth Layer) except that the Sixth Layer coated on the Fifth Layer contained Emulsified Dispersion F in addition to a silver halide emulsion having the same composition as that of the Sixth Layer in Example 1 at a coverage of 1.93 g/m² and the protective layer (Seventh Layer) formed on the Sixth Layer was composed of gelatin only.

In a similar manner to Sample (I), Sample (II) was prepared using Emulsified Dispersion G in place of Emulsified Dispersion F in the Sixth Layer, Sample (III) was Emulsified Dispersion F, Sample (IV) was prepared using Emulsified Dispersion C in place of Emulsified Dispersion F, and Sample (V) was prepared using Emulsified Dispersion D in place of Emulsified Dispersion F.

These sample photographic materials thus prepared were exposed in a camera and processed as described in Example 1, and the density differences of the image formed were measured using each color. The results obtained are shown in Table 3 below.

Table 3

|  | Density Differences | | | | |
|---|---|---|---|---|---|
|  | Sample (I)* | Sample (II)* | Sample (III) | Sample (IV) | Sample (V) |
| Red | 0 | 0 | 0 | 0 | 0 |
| Green | 0 | 0 | 0 | 0 | 0 |
| Blue | 0.14 | 0.13 | 0.07 | 0.06 | 0.06 |

*Comparison sample (The density difference shown in Table 3 has the same significance as in Example 1).

As is clear from the results in Table 3 above, the incorporation of the compound of this invention in the blue-sensitive silver halide photographic emulsion layer of the photographic material has a large effect in effectively cutting ultraviolet light and reducing the change in color balance due to differences in a camera lens.

EXAMPLE 3

Samples (1) to (7) produced as described in Example 1, were subjected to the following evaluation of the generation of static charges.

A rubber roller positioned at about neutrality in the triboelectric series was rolled 50 times on the protective layer side of each of Samples (1) to (7) in the dark to generate discharge sparks. The samples were then developed as described in Example 1 and the maximum density of the area showing a static mark image in each sample was measured. The results obtained are shown in Table 4 below.

Table 4

|  | Density Difference | | | | | | |
|---|---|---|---|---|---|---|---|
|  | Sample (1)* | Sample (2) | Sample (3) | Sample (4) | Sample (5) | Sample (6)** | Sample (7)** |
| Red Density | 0 | 0 | 0 | 0 | 0 | 0 | 0 |
| Green Density | 0 | 0 | 0 | 0 | 0 | 0 | 0 |
| Blue Density | 1.05 | 0.20 | 0.15 | 0.15 | 0.15 | 0.80 | 0.65 |

*Control sample.
**Comparison sample

The red density, green density, and blue density in Table 4 are the image densities measured using red light, green light and blue light respectively.

As is clear from the results shown in Table 4 above, the incorporation of the compound of this invention into the photographic material effectively reduced the formation of static marks as compared with the control sample and comparison samples.

EXAMPLE 4

In a mixture of 5 ml of tricresyl phosphate and 10 ml of ethyl acetate was dissolved 10 g of Compound 1 of this invention as a ultraviolet absorbing agent and the solution was dispersed by emulsification in 100 g of a 10% aqueous gelatin solution containing 0.375 g of sodium dodecylbenzenesulfonate. The emulsified dispersion was mixed with 200 g of a 10% aqueous gelatin solution. The mixture was coated as the Fourth Layer (interlayer) of a multilayer photographic material (Sample (a)). The other layers of the photographic material are shown in Table 5 below.

Also, for the sake of comparison, 10 g of 2-(2-hydroxy-5-tert-butyl)phenylbenzotriazole was dispersed by emulsification as above, the dispersion was mixed with 20 g of a 10% aqueous gelatin solution, and the mixture was coated as the Fourth Layer of a multilayer photographic material (Sample (b)).

The coated amounts of the ultraviolet absorbing agent, gelatin and tricresyl phosphate of the Fourth Layer are shown in Table 6 below.

A multilayer photographic material in which the Fourth Layer did not contain any ultraviolet absorbing agent was also prepared as a Sample (c).

The photographic materials produced in this example comprised a support with the photographic layers shown in Table 5 below thereon.

Table 5

First Layer:
A blue-sensitive silver chlorobromide emulsion (Br: 50 mole%; coverage of silver: 400 mg/m²) containing a yellow coupler, α-pivaloyl-α-(2,4-dioxo-5,5′-dimethyloxazolidin-3-yl)-2-chloro-5-[α-(2,4-di-t-amylphenoxy)-butanamido]acetanilide at a coverage of 300 mg/m², gelatin at a coverage of 1,200 mg/m², and a coupler solvent, dibutyl phthalate, at a coverage of 150 mg/m².

Second Layer:
An interlayer containing gelatin at a coverage of 1,000 mg/m².

Third Layer:
A green-sensitive silver chlorobromide emulsion layer (Br: 50 mole%; coverage of silver: 400 mg/m²) containing a magenta coupler, 1-(2,4,6-trichlorophenyl)-3-[(2-chloro-5-tetradecanamido)anilino]-5-pyrazolone at a coverage of 300 mg/m², gelatin at a coverage of 1,000 mg/m², a coupler solvent, tricresyl phosphate at a coverage of 300 mg/m², and dioctylhydroquinone at a coverage of 60 mg/m².

Fourth Layer:
An interlayer containing gelatin at a coverage of 1,200 mg/m² and other components as shown in Table 6 below.

Fifth Layer:
A red-sensitive silver chlorobromide emulsion layer (Br: 50 mole%, coverage of silver: 300 mg/m²) containing a cyan coupler, 2-[α-(2,4-di-t-amylphenoxy)-butanamido]-4,6-dichloro-5-methylphenol at a coverage of 400 mg/m², gelatin at a coverage of 1,000 mg/m², and a coupler solvent, dibutyl phthalate, at a coverage of 200 mg/m².

Sixth Layer:

A layer containing gelatin at a coverage of 1,000 mg/m².

Table 6

| | Coated Amount (mg/m²) in the Fourth Layer | | |
|---|---|---|---|
| Component | Sample (a) | Sample (b) | Sample (c) |
| Ultraviolet Absorbing Agent | 400 | 1,000 | 0 |
| Tricresyl Phosphate | 200 | 500 | 0 |
| Gelatin | 1,200 | 1,200 | 1,200 |

These sample photographic materials were exposed through a continuous wedge for one second at 1,000 lux using a green filter and when processed using the following photographic processing.

| Processing Step | Temperature | Time |
|---|---|---|
| Development | 33° C. | 3 min. 30 sec. |
| Blix | 33° C. | 1 min. 30 sec. |
| Wash | 28°–35° C. | 3 min. |
| Developer Solution | | |
| Benzyl Alcohol | | 15 ml |
| Na₂SO₃ | | 5 g |
| KBr | | 0.4 g |
| Hydroxylamine Sulfate | | 2.0 g |
| 4-Amino-3-methyl-N-ethyl-N-β-(methanesulfonamido)ethylaniline | | 10.0 g |
| Na₂CO₃ | | 30.0 g |
| Diethylenetriamine Pentaacetate | | 5.0 g |
| Water to make | | 1 liter |
| | | pH 10.1 |
| Blix Solution | | |
| Ammonium Thiosulfate (70 % aq. soln.) | | 150 ml |
| Na₂SO₃ | | 5 g |
| Na Fe(EDTA) | | 40 g |
| EDTA | | 4 g |
| Water to make | | 1 liter |
| | | pH 6.8 |

Samples with color images thus formed therein were exposed to light from a fluorescent lamp (20,000 lux) for two weeks to evaluate fading. The results obtained are shown in Table 7 below.

Table 7

| | Loss of Density by Fading | |
|---|---|---|
| Sample | Yellow Density at Fogged Portion | Loss of Density at Magenta Initial Density of 2.0 (magenta density) |
| (a)* | +0.4 | 0.55 |
| (b)** | +0.05 | 0.65 |
| (c)** | +0.30 | 0.80 |

*Present invention
**Comparison

The increase in yellow density at the fogged portion (unexposed area) is due to staining by light from a fluorescent lamp.

As is clear from the results shown in Tables 6 and 7 above, the effect obtained with Sample (a) containing the ultraviolet absorbing agent of this invention was the same as or superior to that with Sample (b) despite the fact that the coated amount of the ultraviolet absorbing agent in Sample (a) was 1/2.5 of that in Sample (b).

EXAMPLE 5

In 5 ml of tricresyl phosphate were dissolved 10 g of a cyan coupler, 2-[α-(2,4-di-t-amylphenoxy)-butanamido]4,6-dichloro-5-methylphenol and 2 g of Compound 1 of this invention and the solution was dispersed by emulsification into 80 ml of a 10% aqueous gelatin solution containing 0.3 g of sodium dodecylbenzenesulfonate. The emulsified dispersion was then mixed with 145 g (7.5 g of silver) of a red-sensitive silver chlorobromide emulsion (Br: 50 mole%) and the mixture was coated on a paper support having polyethylene coatings on both surfaces thereof to produce Sample (d).

Also, a cyan coupler-containing emulsified dispersion was prepared in the same manner as described above using, however, 2-(2-hydroxy-5-tert-butyl)phenylbenzotriazole in place of Compound 1 described above as an ultraviolet absorbing agent in an amount of 6 g which was three times that of Compound 1 in Sample (d) and further a cyan coupler-containing emulsified dispersion without any ultraviolet absorbing agent was prepared similarly. Each of the dispersions was mixed with a red-sensitive silver halide emulsion and the mixture was coated on a support as described above to produce Sample (e) and Sample (f) respectively.

Samples (d), (e) and (f) thus prepared were exposed through a continuous wedge for one second at 1000 lux using a red filer and developed as described in Example 1. Each sample having cyan colored color images therein was subjected to fading testing for 2 days using a fade-meter with a xenon lamp (200,000 lux). The density change after fading, the cyan initial density being 2.0, is shown in Table 3.

Table 8

| Sample | Lost of Density at Cyan Initial Density of 2.0 |
|---|---|
| (d)* | 0.25 |
| (e)** | 0.30 |
| (f)** | 0.50 |

*Present invention
**Comparison

As is clear from the results shown in Table 8 above, the ultraviolet absorbing agent of this invention provided effects superior to the comparison samples in an amount of ⅓ of that in the comparison sample.

While the invention has been described in detail and with reference to specific embodiments thereof, it will be apparent to one skilled in the art that various changes and modifications can be made therein without departing from the spirit and scope thereof.

What is claimed is:

1. A silver halide photographic material comprising a support having thereon at least one photosensitive silver halide emulsion layer with the silver halide photographic material containing at least one compound represented by the general formula (I)

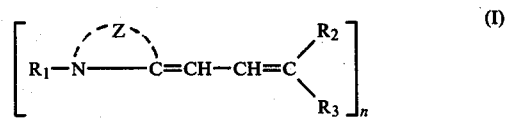

wherein Z represents the atoms necessary for forming a pyrrolidine nucleus or a thiazolidine nucleus; $R_1$ represents an alkyl group or an aryl group; $R_2$ and $R_3$, which may be the same or different, each represents a cyano group or —COOR$_4$; R$_4$ represents an alkyl group or an aryl group; and n is 1 or 2, and when n is 2, one of R$_1$ and R$_4$ represents an alkylene group or an arylene group and the compound is a dimer.

2. The silver halide photographic material as described in claim 1, wherein the silver halide photographic material contains at least one substantially non-photosensitive hydrophilic colloid layer and the compound represented by the general formula (I) is present in said photographic material in the form of an emulsified dispersion.

3. The silver halide photographic material as described in claim 2, wherein the compound represented by the general formula (I) is dispersed in the photosensitive silver halide emulsion layer or the substantially non-photosensitive hydrophilic colloid layer as droplets of a solution thereof in a substantially water-insoluble high-boiling organic solvent or impregnated in particles of a latex polymer.

4. The silver halide photographic material as described in claim 1, 2 or 3 wherein the compound represented by the general formula (I) is at least one of

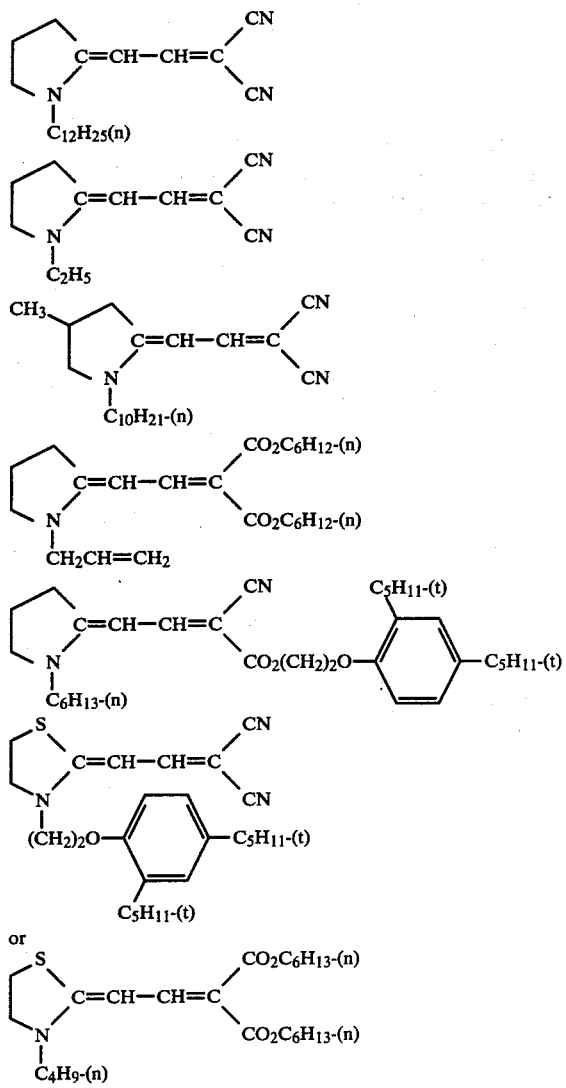

5. The silver halide photographic material as described in claim 3, wherein the latex polymer is at least one latex polymer selected from the group consisting of polymers containing one or more of an alkyl acrylate, an alkyl methacrylate, an alkoxyalkyl acrylate, an alkoxyalkylmethacrylate, a glycidyl acrylate, a glycidyl methacrylate, acrylamide, methacrylamide, a vinyl ester, acrylonitrile, an olefin, and styrene, as a monomer, and polymers containing a combination of one or more of the above monomers and one or more of acrylic acid, methacrylic acid, an α,β-unsaturated dicarboxylic acid, a hydroxyalkyl acrylate, a hydroxyalkyl methacrylate, a sulfoalkyl acrylate, a sulfoalkyl methacrylate, and styrenesulfonic acid, as a monomer.

6. The silver halide photographic material as described in claims 1, 2 or 3, wherein the compound represented by the general formula (I) is present in an uppermost non-photosensitive hydrophilic colloid layer or in an uppermost silver halide photosensitive layer.

7. The silver halide photographic material as described in claims 1, 2 or 3, wherein said silver halide photographic material comprises a support having thereon, in order from the support, an antihalation layer, a red sensitive silver halide emulsion layer containing a cyan dye-forming coupler, an interlayer, a green sensitive silver halide emulsion layer containing a magenta dye-forming coupler, a yellow filter layer, a blue sensitive silver halide emulsion layer containing a yellow dye-forming coupler and a protective layer.

8. A method of preventing the effects of ultraviolet light on a silver halide photographic material comprising a support having thereon at least one photosensitive silver halide emulsion layer which comprises incorporating an emulsified dispersion of at least one compound represented by the general formula (I)

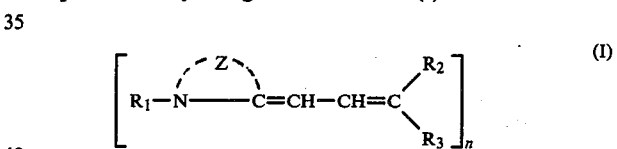

wherein Z represents the atoms necessary for forming a pyrrolidine nucleus or a thiazolidine nucleus; R$_1$ represents an alkyl group or an aryl group; R$_2$ and R$_3$, which may be the same or different, each represents a cyano group or —COOR$_4$; R$_4$ represents an alkyl group or an aryl group; and n is 1 or 2, and when n is 2, one of R$_1$ and R$_4$ represents an alkylene group or an arylene group and the compound is a dimer.

9. The method of claim 8, wherein said silver halide photograhic material is an unexposed silver halide photographic material.

10. The method of claim 8, wherein the silver halide photographic material contains at least one substantially non-photosensitive hydrophilic colloid layer and the compound represented by the general formula (I) is incorporated in said photographic material in the form of an emulsified dispersion.

11. The method of claim 10, wherein the compound represented by the general formula (I) is dispersed in the photosensitive silver halide emulsion layer or the substantially non-photosensitive hydrophilic colloid layer as droplets of a solution thereof in a substantially water-insoluble high-boiling organic solvent or impregnated in particles of a latex polymer.

12. The method of claims 8, 10 or 11, wherein the compound represented by the general formula (I) is at least one of

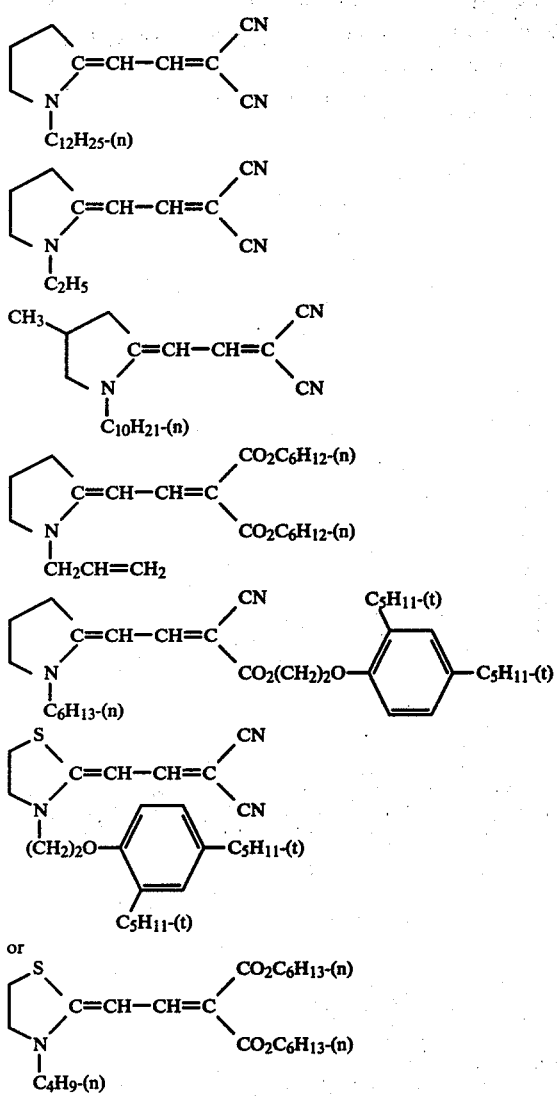

13. The method of claim 11, wherein the latex polymer is at least one latex polymer selected from the group consisting of polymers containing one or more of an alkyl acrylate, an alkyl methacrylate, an alkoxyalkyl acrylate, an alkoxyalkylmethacrylate, a glycidyl acrylate, a glycidyl methacrylate, acrylamide, methacrylamide, a vinyl ester, acrylonitrile, an olefin, and styrene, as a monomer, and polymers containing a combination of one or more of the above monomers and one or more of acrylic acid, methacrylic acid, an α,β-unsaturated dicarboxylic acid, a hydroxyalkyl acrylate, a hydroxyalkyl methacrylate, a sulfoalkyl acrylate, a sulfoalkyl methacrylate, and styrenesulfonic acid, as a monomer.

14. The method of claims 8, 10 or 11, wherein the compound represented by the general formula (I) is incorporated in an uppermost non-photosensitive hydrophilic colloid layer or in an uppermost silver halide photosensitive layer.

15. The method of claims 8, 10 or 11 wherein said silver halide photographic material comprises a support having thereon, in order from the support, an antihalation layer, a red sensitive silver halide emulsion layer containing a cyan dye-forming coupler, an interlayer, a green sensitive silver halide emulsion layer containing a magenta dye-forming coupler, a yellow filter layer, a blue sensitive silver halide emulsion layer containing a yellow dye-forming coupler and a protective layer.

16. The silver halide photographic material as described in claim 1, wherein the compounds represented by general formula (I) have the following general formula (II):

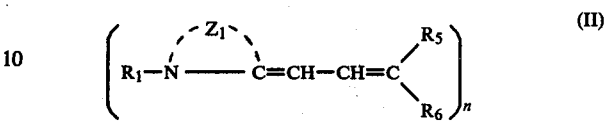

wherein $Z_1$ represents the atoms necessary for forming the pyrrolidone nucleus; $R_5$ and $R_6$, which may be the same or different, each represents a cyano group, or $-COOR_7$; and $R_1$, $R_7$ and n have the same meaning as $R_1$, $R_4$ and n, respectively, in the general formula (I).

17. The silver halide photographic material as described in claim 16, wherein when the compound of general formula (II) is a monomer, the total of the number of carbon atoms of $R_1$, $R_5$ and $R_6$ is 10 to 40 and, when the compound of general formula (II) is a dimer, the total (when $R_5$ or $R_6$ is a divalent group) number of carbon atoms of $R_6$ (or $R_5$) and twice the number of carbon atoms of $R_1$ or the total (when $R_1$ is a divalent group) of the number of carbon atoms of $R_1$ and twice the number of carbon atoms of $R_6$ (or $R_5$) is 14 to 45.

18. The silver halide photographic material as described in claim 1, wherein said compound of general formula (I) is:

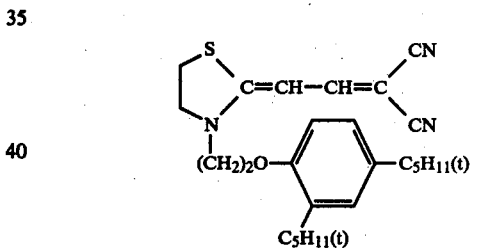

19. The silver halide photographic material as described in claim 1, wherein said compound of general formula (I) is:

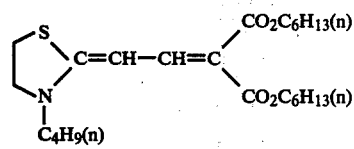

20. A method of preventing the effects of ultraviolet light on a supported image-wise exposed and development processed silver halide photographic material containing images therein which comprises incorporating an emulsified dispersion of at least one compound represented by the general formula (I)

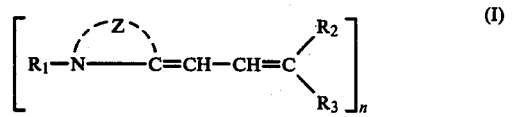

wherein Z represents the atoms necessary for forming a pyrrolidone nucleus or a thiazolidine nucleus; $R_1$ represents an alkyl group or an aryl group; $R_2$ and $R_3$, which may be the same or different, each represents a cyano group, or —$COOR_4$; $R_4$ represents an alkyl group or an aryl group; and n is 1 or 2, and when n is 2, one of $R_1$ and $R_4$ represents an alkylene group or an arylene group and the compound is a dimer.

* * * * *